United States Patent
Weng et al.

(10) Patent No.: US 11,748,898 B2
(45) Date of Patent: Sep. 5, 2023

(54) METHODS AND SYSTEM FOR INFRARED TRACKING

(71) Applicant: SZ DJI TECHNOLOGY CO., LTD., Shenzhen (CN)

(72) Inventors: Chao Weng, Shenzhen (CN); Wei Zhang, Shenzhen (CN); Mingxi Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/064,771

(22) Filed: Dec. 12, 2022

(65) Prior Publication Data

US 2023/0111493 A1    Apr. 13, 2023

Related U.S. Application Data

(63) Continuation of application No. 16/728,448, filed on Dec. 27, 2019, now Pat. No. 11,526,998, which is a
(Continued)

(51) Int. Cl.
| | |
|---|---|
| *G06T 7/246* | (2017.01) |
| *G06T 7/223* | (2017.01) |
| *B64C 39/02* | (2023.01) |
| *G05D 1/02* | (2020.01) |
| *G05D 1/12* | (2006.01) |

(Continued)

(52) U.S. Cl.
CPC ............ *G06T 7/246* (2017.01); *B64C 39/024* (2013.01); *G05D 1/0202* (2013.01); *G05D 1/12* (2013.01); *G06T 5/50* (2013.01); *G06T 7/223* (2017.01); *B64U 2101/30* (2023.01); *B64U 2201/20* (2023.01); *G06T 2207/10036* (2013.01);
(Continued)

(58) Field of Classification Search
CPC .......... G06T 7/246; G06T 2207/10048; G06T 2207/20221; B64C 39/024; B64C 2201/123; B64C 2201/127; B64C 2201/146; G05D 1/0202; G05D 1/12
See application file for complete search history.

(56) References Cited

U.S. PATENT DOCUMENTS

| | | | |
|---|---|---|---|
| 2014/0312165 A1 | 10/2014 | Mkrtchyan | |
| 2017/0061663 A1 | 3/2017 | Johnson et al. | |

FOREIGN PATENT DOCUMENTS

| | | |
|---|---|---|
| CN | 105416584 A | 3/2016 |
| CN | 205469861 U | 8/2016 |
| | (Continued) | |

OTHER PUBLICATIONS

The World Intellectual Property Organization (WIPO) International Search Report and Written Opinion for PCT/CN2017/109364 dated Jul. 20, 2018 7 Pages.

*Primary Examiner* — Vivek D Koppikar
*Assistant Examiner* — Jeffrey R Chalhoub
(74) *Attorney, Agent, or Firm* — ANOVA LAW GROUP, PLLC

(57) ABSTRACT

A method for tracking includes obtaining an infrared image and a visible image from an imaging device supported by a carrier of an unmanned aerial vehicle (UAV), combining the infrared image and the visible image to obtain a combined image, identifying a target in the combined image, and controlling at least one of the UAV, the carrier, or the imaging device to track the identified target. Combing the infrared image and the visible image includes matching the infrared image and the visible image based on matching results of different matching methods.

18 Claims, 12 Drawing Sheets

Related U.S. Application Data continuation of application No. PCT/CN2017/109364, filed on Nov. 3, 2017.

(51) Int. Cl.
*G06T 5/50* (2006.01)
*B64U 101/30* (2023.01)

(52) U.S. Cl.
CPC ............... *G06T 2207/10048* (2013.01); *G06T 2207/20221* (2013.01)

(56) References Cited

FOREIGN PATENT DOCUMENTS

| | | |
|---|---|---|
| CN | 106354157 A | 1/2017 |
| CN | 106485245 A | 3/2017 |
| CN | 104134208 B | 4/2017 |
| WO | 2016015251 A1 | 2/2016 |

METHODS AND SYSTEM FOR INFRARED TRACKING

CROSS-REFERENCE TO RELATED APPLICATIONS

This application is a continuation of U.S. application Ser. No. 16/728,448, filed on Dec. 27, 2019, which is a continuation of International Application No. PCT/CN2017/109364, filed Nov. 3, 2017, the entire contents of both of which are incorporated herein by reference.

BACKGROUND OF THE DISCLOSURE

Modern unmanned aerial vehicles (UAVs) are used to perform a variety of tasks such as navigation, surveillance and tracking, remote sensing, search and rescue, scientific research, and the like. In particular, UAVs equipped with infrared cameras are useful in surveillance, inspection, and search and rescue operations. However, tracking objects can be difficult using only infrared information acquired by such infrared cameras, especially when the objects and the surrounding environment have similar temperatures.

SUMMARY OF THE DISCLOSURE

According to embodiments, a computer-implemented method is provided for tracking. The method comprises obtaining, from an imaging device supported by a carrier of an unmanned aerial vehicle (UAV), an infrared image and a visible image; obtaining a combined image based on the infrared image and the visible image; identifying a target in the combined image; and generating control signals for tracking the identified target using the imaging device.

According to embodiments, an unmanned aerial vehicle (UAV) is provided. The UAV comprises a memory that stores one or more computer-executable instructions; and one or more processors configured to access the memory and execute the computer-executable instructions to perform a method comprising obtaining, from an imaging device supported by a carrier of the UAV, an infrared image and a visible image; obtaining a combined image based on the infrared image and the visible image; identifying a target in the combined image; and generating control signals for tracking the identified target using the imaging device.

According to embodiments, a tracking system is provided. The tracking system comprises a memory that stores one or more computer-executable instructions; and one or more processors configured to access the memory and execute the computer-executable instructions to perform a method comprising obtaining, from an imaging device supported by a carrier of an unmanned aerial vehicle (UAV), an infrared image and a visible image; obtaining a combined image based on the infrared image and the visible image; identifying a target in the combined image; and generating control signals for tracking the identified target using the imaging device.

In some embodiments, obtaining the combined image can comprise processing the infrared image to extract infrared features; processing the visible image to extract visible features; matching the infrared image and the visible image based on the infrared features and the visible features; and applying at least one of the visible features to the infrared image to generate the combined image based on the matching.

In some embodiments, the infrared features comprise an infrared outer contour and the visible features comprise a visible outer contour, and wherein matching the infrared image and the visible image comprises aligning the infrared outer contour with the visible outer contour. In some embodiments, applying at least one of the visible features to the infrared image can comprise determining an intensity of the at least one visible feature in the combined image based on a configurable parameter. In some embodiments, an amount of the visible features to apply to the infrared image can be determined based on a configurable parameter.

In some embodiments, identifying the target in the combined image can comprise obtaining target information from a remote terminal and identifying the target based on the target information.

In some embodiments, generating the control signals for tracking the identified target can comprise determining whether to control the UAV, the carrier, or the imaging device based on a current configuration of the UAV, the carrier, or the imaging device.

In some embodiments, generating the control signals for tracking the identified target can comprise detecting a deviation of the target from a predetermined configuration and generating the control signals for substantially correcting the deviation.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

The systems, devices, and methods are provided for tracking targets that address some or all problems discussed above. Specifically, targets can be more easily detected and tracked in combined images that are generated based on both infrared images and visible images obtained from an imaging device carried, via a carrier, by an unmanned aerial vehicle (UAV). The combined images contain features from the visible images that may not be easily detectable in the infrared images, thereby combining the advantages of both infrared imaging and visible imaging. The combined images can be used, by one or more processors, to identify the target. The identification of the target in the images can be used to generate control signals for tracking the target in subsequent images. For example, the control signals can be used to control the UAV, the carrier, and/or the imaging device.

Figure 1:
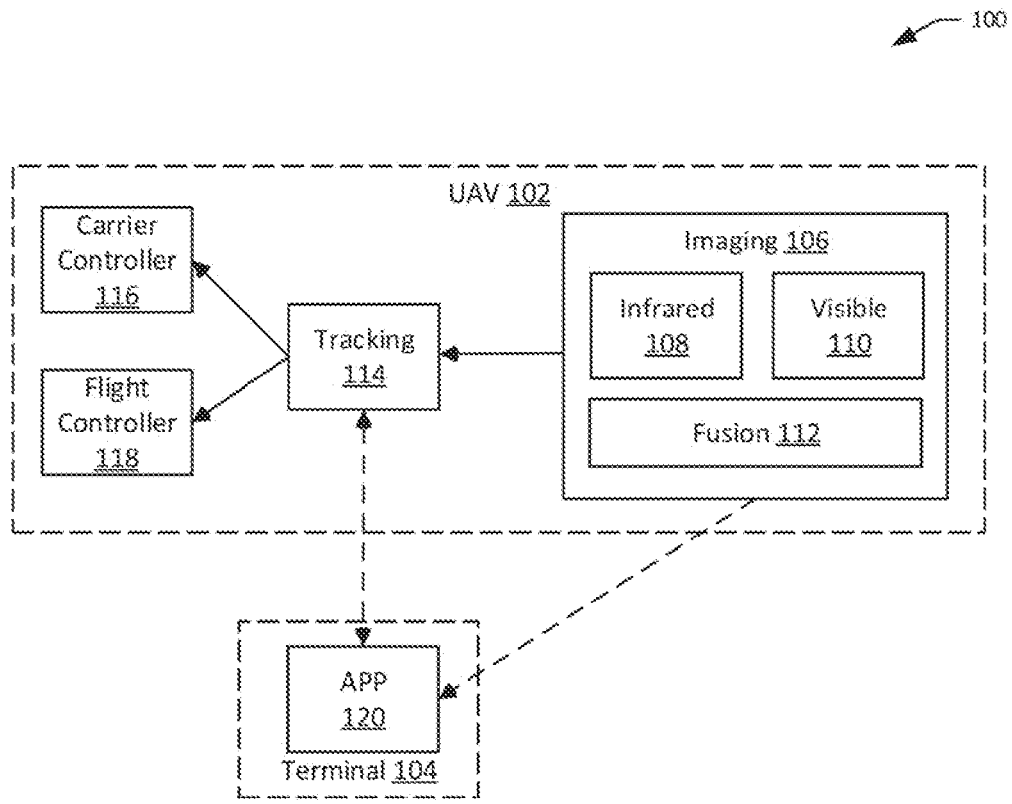
FIG. 1 illustrates an example of a tracking system, according to embodiments.

FIG. 1 illustrates an example of a tracking system 100, according to embodiments. The tracking system can be configured to obtain combined images that are generated based on both infrared images and visible images, identify a target in these combined images, and generate control signals for tracking the target. In some embodiments, the tracking system 100 can include an imaging module 106, a tracking module 114, a flight controller 118, and a carrier controller 116, and optionally a tracking application 120. The imaging module 106, tracking module 114, the flight controller 118 and the carrier controllers 116 may be onboard a UAV 102. The tracking application 120 may be implemented on a terminal device 104 that is remote to the UAV 102 but that is in communication with the UAV 102. Examples of such terminal device 104 may include a remote controller, a base station, a server computer, a laptop computer, a tablet, a smart phone, a wearable device (e.g., helmet, glasses/goggle, wrist band), and the like.

The imaging module 106 can be configured to capture both infrared images and visible images and to generate combined images. The imaging module 106 can include an infrared imaging module (or infrared module) 108, a visible imaging module (or visible module) 110, and a fusion module 112. The infrared module 108 can be configured to detect and form images based on infrared radiation (e.g., with a wavelength between 700 nm and 1 mm). For example, the infrared module 108 can be configured to output data representing one or more frames of infrared images (infrared image data, infrared data, infrared data stream, or infrared bit stream). The visible module 110 can be configured to detect and form images based on visible light (e.g., with a wavelength between 400 nm and 700 nm). For example, the visible module 110 can be configured to output data representing one or more frames of visible images (visible image data, visible data, visible image stream, or visible bit stream).

The infrared module 108 and the visible module 110 can be implemented by a separate infrared camera and a separate visible camera, respectively. For example, the infrared module 108 and the visible module 110 can each be included in a separate housing. In another example, the infrared module 108 or the visible module 110 may be implemented by an assembly that is part of a larger imaging device (e.g., a dual-light camera), which includes both the infrared module 108 and the visible module 110. For example, the infrared module 108 and the visible module 110 may be co-located in the same housing.

In some embodiments, the infrared module 108 and the visible module 110 can be configured to capture images with overlapping field of views (FOVs). In some examples, the FOV of the visible module 110 may cover about 10%, 20%, 30%, 40%, 50%, 60%, 70%, 80%, 90%, or 100% of the FOV of the infrared module 108. In some other examples, the FOV of the infrared module 108 may cover about 10%, 20%, 30%, 40%, 50%, 60%, 70%, 80%, 90%, or 100% of the FOV of the visible module 110.

In some embodiments, the infrared module 108 and the visible module 110 can be configured to capture images substantially concurrently. For example, the infrared module 108 and the visible module 110 can be configured to start detecting infrared radiation and visible light, respectively, within 0.001, 0.01, or 0.1 seconds of each other. For example, the infrared module 108 and the visible module 110 may share common camera settings (e.g., on/off control, shutter, zoom) and/or different camera settings. Accordingly, in some embodiments, an infrared image in the infrared image stream that is produced by the infrared module 108 has a corresponding visible image in the visible image stream that is produced by the visible module 110. The infrared image may be captured or generated at approximately the same time as the corresponding visible image. In some other embodiments, the infrared image and the corresponding visible image may be captured and/or generated at different points in time.

In some embodiments, the infrared module 108 and/or the visible module 110 can be configured to provide raw image data as output by their respective image sensors or sensor arrays (e.g., CMOS sensors, CCD sensors, focal-plane arrays (FPAs)). In some other embodiments, the infrared module 108 and/or the visible module 110 can be configured to pre-process the raw image data output by their respective image sensors. Example such pre-processing operations may include filtering (or color correction), re-sampling, noise-reduction, scaling, enhancement, transformation, and the like. In some other embodiments, the infrared module 108 and/or the visible module 110 can be configured to perform more complex image processing operations such as classification, feature extraction, pattern recognition, face recognition, image registration, and the like.

The fusion module 112 can be configured to combine the infrared image data from the infrared module 108 and the visible image data from the visible module 110 to generate combined image data. For example, each infrared image frame from an infrared image stream and the corresponding visible image frame from the visible image stream can be processed to generate a combined frame in a combined image stream.

In some embodiments, the fusion module 112 can be configured to perform some or all of the operations discussed above with respect to the infrared module 108 and the visible module 110. For example, the fusion module 112 can be configured to extract features from, or perform transformation of an infrared image and/or a visible image. The extracted features from the infrared image (infrared features) and the extracted features from the visible image (visible features) can be used to match or align the infrared image and the visible image. Based on the matching or alignment of infrared image and the visible image, some or all extracted features of the visible image can be applied to the infrared image to generate the combined image. In some other embodiments, some or all extracted features of the infrared image can be applied to the visible image to generate the combined image. Further details for generating the combined image are provided in the discussion of FIGS. 3-4.

The imaging module 106 can be configured to provide the combined images to the tracking module 114 and optionally to the tracking application (app) 120. The tracking module 114 can be configured to receive the combine images from the imaging module 106, identify one or more target objects within the combined images and track the identified target objects by controlling the UAV, the carrier, and/or the imaging device(s). The imaging devices may include or be included in the imaging module 106.

The tracking module 114 can be configured to identify a target object based on target information. Target information can describe the characteristics of a specific target in an image including color, texture, pattern, size, shape, dimension, position, and the like. The target information can be extracted from previously-obtained combined images. For example, a target region of an image can be analyzed by the tracking module 114 to extract target features such as patterns, boundaries, edges, and the like. The extracted target features may be stored by the tracking module 114 (e.g., in a local storage onboard the UAV 102) to facilitate the identification of the target in subsequent images.

The target information can also be obtained from a remote user or device. For example, a user may specify the general characteristics of a target to track (e.g., color, pattern), e.g., using the tracking app 120, and such specification is then provided to the tracking module 114. As another example, the target information may be retrieved from a remote device or remote data storage. In some examples, the target information may be retrieved from local storage onboard the UAV 102. Further details for target identification are provided in the discussion of FIGS. 5-6.

After identifying the target in the combined image using target information, the tracking module 114 may be configured to detect a deviation of the target from a predetermined configuration, such as a predetermined target position or a predetermined target size. For example, the predetermined configuration can include a previous configuration of the target in a previous image such as a previous target position or a previous target size. Alternatively or additionally, the predetermined configuration can include a predefined configuration such a predefined target position (e.g., center) or predefined target size (e.g., number of pixels). The predefined configuration may be set by default or specified by a user or a system administrator, e.g., using tracking app 120.

The deviation of the target from the predetermined configuration may be used by the tracking module 114 to generate control signals for the flight controller 118, which is configured to control the UAV and/or for the carrier controller 116, which is configured to control the carrier. The control signals may be used to effect movement of the UAV and/or the carrier, so as to effect movement of the imaging devices, and eventually to cause subsequent reduction of the deviation of the target from the predetermined configuration. Further details for the generation of control signals are provided in the discussion of FIGS. 7-9.

The tracking system 100 can optionally include a tracking app 120 that is installed and run on a remote terminal 104. The tracking app 120 can be configured to receive image data directly or indirectly from the imaging module 106. The image data can include infrared images (e.g., infrared image stream), visible images (e.g., visible image stream), and/or combined images (e.g., combined image stream). The tracking app 120 can be configured to display the received images on a display of the terminal 104. In an example, the tracking app 120 provides a user interface for toggling the display to show three different types of images for display, the infrared image, the visible image, and the combined image. The tracking app 120 may allow a user to select a target region or a target object on a displayed image. For example, the user may use a finger or a stylus to tap or circle a target region on a touchscreen where a combined image is displayed.

Target information comprising the coordinates and/or the boundary of the selected target region or object can be collected by the tracking app 120 and transmitted to the tracking module 114. Using the target information from the tracking app 120 and the image data received from the imaging module 106, the tracking module 114 can analyze the selected target region to extract target features useful for tracking purposes. The tracking module 114 can also be configured to transmit and the tracking app 120 can be configured to receive updated target information such as updated target position and/or size as identified in subsequent images. Upon receiving such updated target information, the tracking app 120 can be configured to display a target indicator or tracking indicator (e.g., a bounded box) along with the corresponding combined image received from the imaging module 106, such as the user can track the target in the image. Further details for the tracking app 120 are provided in the discussion of FIG. 10.

Figure 2:
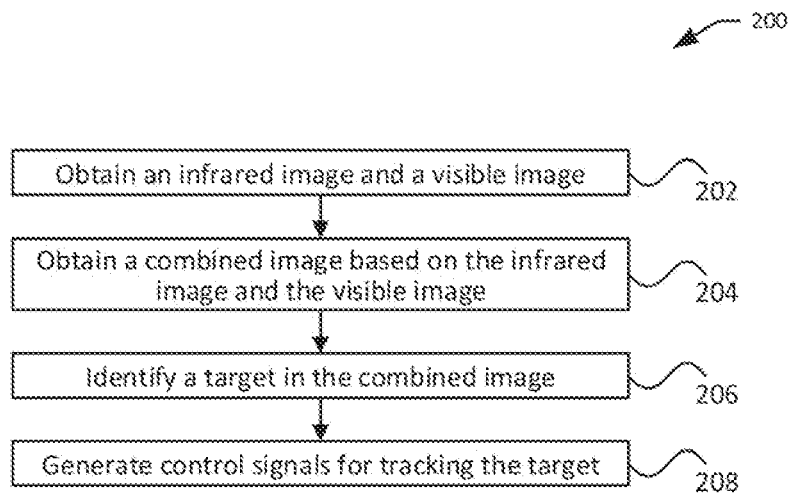
FIG. 2 illustrates an example of a process for tracking a target, in accordance with embodiments.

FIG. 2 illustrates an example of a process 200 for tracking a target, in accordance with embodiments. Some or all aspects of the process 200 (or any other processes described herein, or variations and/or combinations thereof) may be performed by one or more processors onboard the UAV, a payload of the UAV (e.g., an imaging device), and/or a remote terminal. Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 202, an infrared image and a visible image are obtained. The infrared image or the visible image can include an image frame in a series of image frames obtained by an infrared sensor or sensor array. The infrared image and the visible image can be obtained by an imaging system 106 described in FIG. 1. The imaging system 106 can include a single imaging device capable of capturing both infrared images and visible images. Alternatively, the infrared image and the visible image can be captured by separate imaging devices. The imaging device(s) can be carried by a carrier that is coupled to a UAV 102, as described elsewhere herein. The carrier may be controlled by a carrier controller 116 to allow movement of the imaging device(s) along and/or around one, two, or three axes.

At block 204, a combined image based on the infrared image and the visible image is obtained. In some embodiments, the infrared image and the visible image are matched against each other, then the infrared image is enhanced or augmented with additional features (e.g., edges) that are extracted from the visible image to generate the combined image. The combined image provides more details and features compared with the infrared image or the visible image alone, and hence allows for more efficient target tracking. Further details for generating the combined image are provided in the discussion of FIGS. 3-4.

At block 206, a target is identified in the combined image. The identification of the target can be based on user-provided information and/or previous image processing results. For example, information about the target, such as the coordinates and/or dimension of the target within an image, may be obtained from a remote terminal based on a user selection of a target region on the image displayed on the remote terminal. In some embodiments, the selection of the target region may be performed by an automated or a semi-automated process. For example, the process may select the target region based on predefined criteria. The target region may be analyzed to extract further target information such as colors, textures, patterns, lines, points, and other features that are useful for identification of the target in images. In some embodiments, target information that results from the processing of a first image can be used to identify the target in a second image, for example, using various classification and pattern recognition techniques. Further details for target identification are provided in the discussion of FIGS. 5-6.

At block 208, the control signals are generated for tracking the target. In an embodiment, movement of the target can be detected by analyzing a series of combined images. Based on the movement of the target, the corresponding movement of the FOV of the imaging device(s) used to track the target may be calculated. To effect the movement of the FOV of the imaging device(s), the corresponding movement of the UAV and/or carrier can be calculated and the control signals for effecting such movement of the UAV and/or carrier may be generated using suitable control parameters and dynamic models. In some examples, control signals for the imaging device(s) (e.g., zoom in/out) may be generated for effecting the movement of the FOV of the imaging device(s). Further details for tracking control are provided in the discussion of FIGS. 7-9. In some embodiments, the target tracking process 200 may be continued as additional infrared images and visible images become available.

Figure 3:
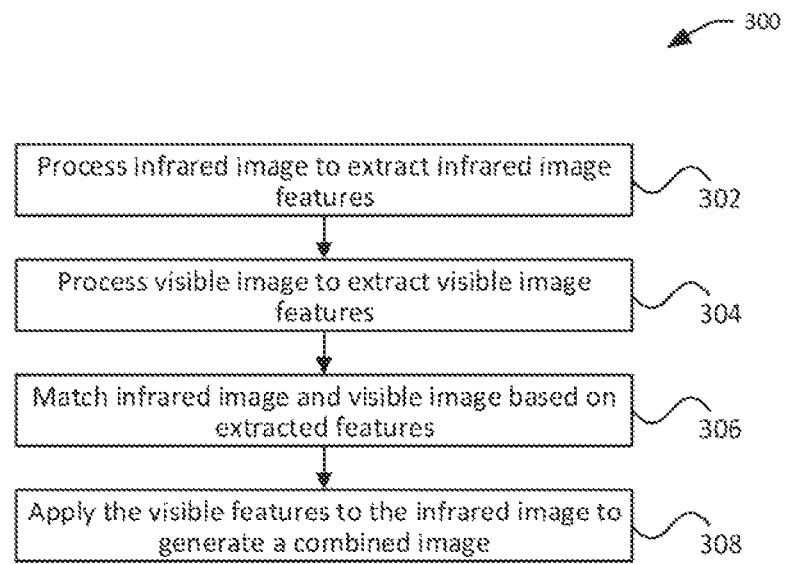
FIG. 3 illustrates an example of a process for generating a combined image based on an infrared image and a visible image, in accordance with embodiments.

FIG. 3 illustrates an example of a process 300 for generating a combined image based on an infrared image and a visible image, in accordance with embodiments.

At block 302, the infrared image is processed to extract infrared image features (infrared features). The infrared image may be obtained from an infrared sensor or sensor array, which may be a part of the infrared module 108 discussed in FIG. 1. In some embodiments, the obtained infrared image may be pre-processed. For example, a colored infrared image may be converted to a greyscale and/or filtered using one or more filters. Additionally or alternatively, pre-processing the infrared image may include applying edge detection techniques to the infrared image to obtain an edge map (or binary map).

In some embodiments, morphological operations may be applied to the pre-processed infrared image (e.g., greyscale image or binary map), for example, to reduce secondary or insignificant features (e.g., small objects, regions without obvious edges or boundaries), while retaining primary or prominent features. Examples of such morphological operations can include dilation, erosion, opening, closing, thinning, thickening, and the like.

In some embodiments, image segmentation techniques may be applied to the infrared image to partition the image into a set of segments that collectively cover the entire image or to extract a set of contours. Pixels in the same region are similar with respect to a certain characteristic, such as color, intensity, texture, and the like; while adjacent regions are different with respect the same characteristic. In some embodiments, image segmentation can include detecting and segmenting salient regions, so as to retain salient target regions. For example, a saliency map may be generated using machine learning techniques (e.g., neural networks, deep learning).

In some embodiments, image segmentation can include extracting the outer contours or boundaries from the infrared image. In an example, the most prominent features are kept, for example, after morphological operations and saliency related operations. The edges of the inner contours of connected regions can be filtered while retaining the edges of main outer contours or boundaries. Infrared images often lack information about edges of inner contour due to the similarity in temperature in the interior regions. Accordingly, for more efficient feature matching between the infrared image and the visible image (described below), it can be useful to filter out or remove the inner contour information in the infrared and visible images. Doing so can also reduce the texture and pattern information of the images, increase the detection rate (e.g., of using the Hu invariants moments), and reduces the computation complexity.

At block 304, the visible image is processed to extract visible image features (visible features). In some embodiments, some or all of the outer contours of visible image are detected and extracted. Optionally, the extracted features can include other features such as inner contours, edges, corners, curvature, lines, shapes, blobs, salient regions, and the like. Any suitable feature recognition (e.g., face recognition) and feature extraction techniques may be used.

At block 306, the infrared image and the visible image are matched based on the extracted features. In some embodiments, the outer contours extracted from the infrared image in block 302 above and the outer contours extracted from the visible image in block 304 above can be matched. For example, for each infrared contour, the corresponding or matching visible contour in the visible image can be sought. In some embodiments, multiple contour matching algorithms may be applied and the respective results may be weighted and combined to derive the final contour matching result. For example, a first contour matching algorithm can utilize Hu invariant moments (e.g., invariants with respect to translation, scale, and rotation). A second contour matching algorithm can utilize template matching. The first result of applying the first contour matching algorithm and the second result of applying the second contour algorithm can each be assigned a suitable weight. The weighted first result and the weight second result can then be combined (e.g., linearly or non-linearly) to derive the final matching result. The matching result may indicate how closely the infrared contour and the visible contour match. In some embodiments, the smaller the value the matching result is, more closely matched the contours are; and the larger the value the matching result is, less closely matched the contours are. In alternative embodiments, the larger the value the matching result is, less closely matched the contours are; and vice versa.

In some embodiments, the centroids of matching contours can be respectively calculated. Such centroids of matching contours can be used to align the infrared image and the visible image. For example, translation, rotation, scaling, and/or other linear and/or non-linear transformations may be performed to the visible image, such that the transformed visible image is substantially aligned with the infrared image at the centroids. As another example, such transformations may be performed to the infrared image, such that the transformed infrared image is substantially aligned with the visible image at the centroids. In various embodiments, two centroids are considered substantially aligned when the pixel coordinates of the centroids coincide or are within close proximity to each other (e.g., within 1 pixel, 2 pixels, 5 pixels, 10 pixels, and so on).

Advantageously, the contour matching method described herein improves the efficiency compared with traditional pixel-level image matching or image fusion methods. The outer contours are typically the most prominent features of infrared images. By using only outer contours of the infrared image to find the corresponding outer contours in the visible image, the amount of redundant data and computation can be reduced compared with that of the pixel-level image matching/fusion methods. Additionally, the infrared image and the visible image can be automatically aligned in real-time or nearly real-time without human intervention, improving the speed, accuracy, and cost of image alignment.

At block 308, at least some of the visible features are applied to the infrared image to generate a combined image. In some embodiments, based on the image matching performed in block 306, edge information extracted from the visible image can be applied to the infrared image. For example, after aligning the infrared image and the visible image as described in block 306, one or more edges in the visible image can be added to the corresponding position in the infrared image. Such visible features may be hard to detect in the infrared image due to similar temperatures of objects in a scene. Adding such visible features to the infrared image improves the rate of detection in the combined image. In some embodiments, the infrared image to which the additional visible features are added can be the original infrared image obtained from the image sensor or sensor array, or a processed infrared image (e.g., from block 302).

In some embodiments, an amount and/or a strength of the visible features added to the infrared image can be controlled by one or more parameters. The parameters may be configurable, for example, by a system administrator or a user. For example, a first parameter may be used to control the amount of edges from the visible image to be added to the infrared image. The higher the parameter value, the more edge information is added, and vice versa. In an example, the visible features to be added (e.g., edges) may be ranked by their prominence and the most prominent N features are selected to be added, where N is controllable by the first parameter. The same parameter or a second parameter may be used to vary the prominence or intensity of the features that have been selected to be added to the combined image. In an example, the higher the parameter value, the more intense or obvious the added features may appear in the infrared image. In another example, the opposite may be true.

In some embodiments, calibration may be performed (e.g., prior to image collection) with respect to the infrared module and the visible module to ensure accurate and effective image processing. In an example, a lens assembly of the visible module may be fixedly coupled to an object (e.g., a circuit board), while a lens assembly of the infrared module may be movably coupled to the object, such that the FOV of the infrared lens assembly can be adjusted during calibration. The optical centers of the infrared lens assembly and the visible lens assembly are preferably leveled. The baseline between the optical centers are preferably configured to allow the FOV of the visible module to cover the FOV of the infrared module, while preventing or reducing the interference between the FOVs. The calibration can be performed to determine or verify the intrinsic and/or extrinsic parameters. Intrinsic parameters may be any parameters that are dependent on hardware configurations. In some cases, the intrinsic parameters may be set by a factory setting for the sensor. Examples of intrinsic parameters may include focal length, scale factor, radial distortion coefficients, and tangential distortion coefficients. Examples of extrinsic parameters may include relative locations, rotations, and/or displacements between the two imaging modules. In some embodiments, the calibration may be performed before or during the capture and/or processing of the image data. The calibrated parameters can be used during one or more the steps in process 300 described above. For example, the extrinsic parameters can be used to match the visible image and the infrared image in block 306 described above.

Figure 4:
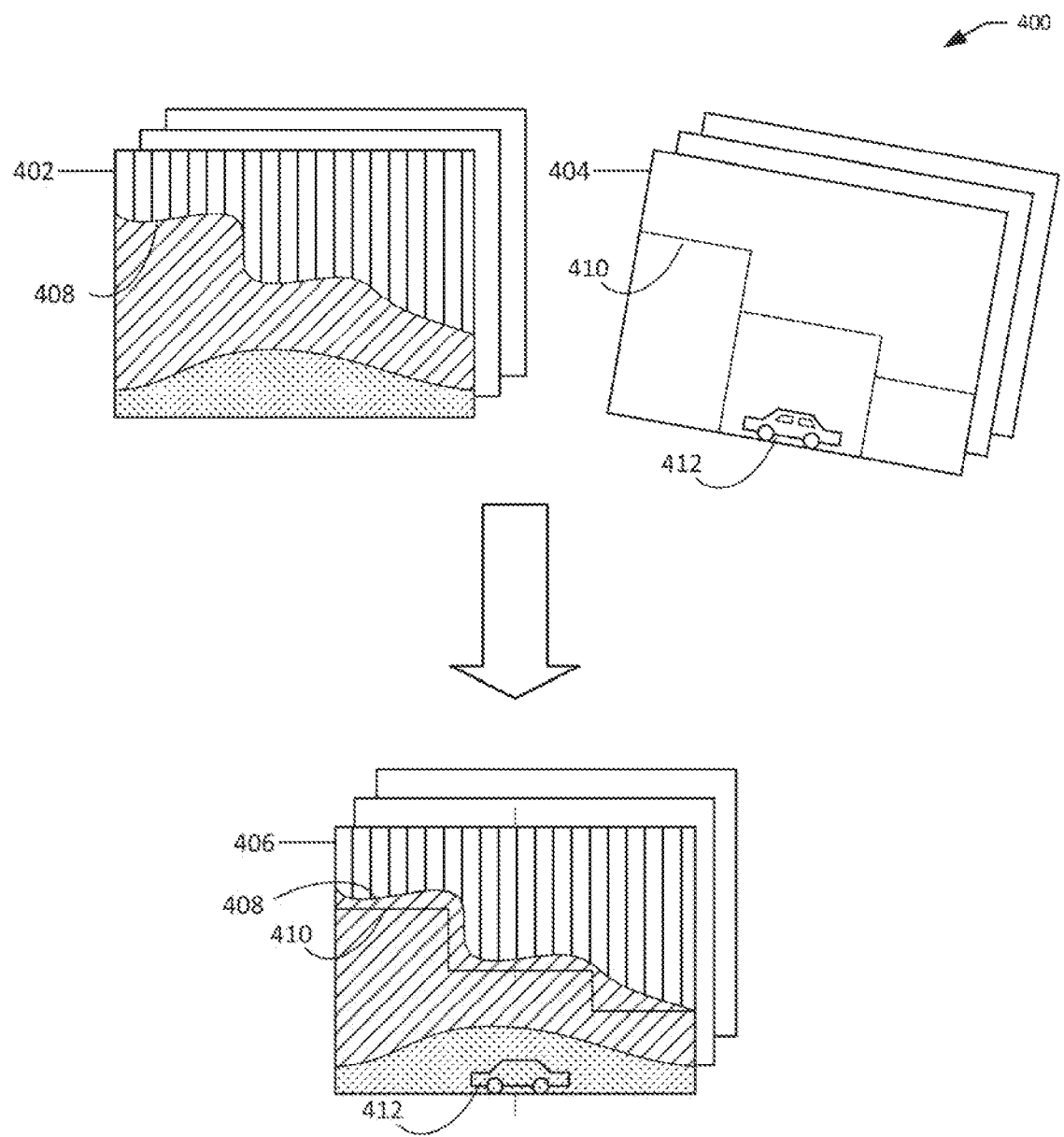
FIG. 4 illustrates an example of a process for generating a combined image based on an infrared image and a visible image, in accordance with embodiments.

FIG. 4 illustrates an example of a process 400 for generating a combined image based on an infrared image and a visible image, in accordance with embodiments. For example, an infrared image 402 from a plurality of infrared image frames can be combined with a corresponding visible image 404 from a plurality of visible image frames to generate a combined image 406 of a plurality of combined image frames.

As illustrated, the infrared image 402 may have one or more outer contours 408. The visible image 404 may have one or more outer contours 410, as well as additional features such as those of a target object 412. The target object 412 may have a temperature that is similar to that of the surrounding environment, such that the features of the target object are not distinctive in the infrared image 402.

In the illustrated example, the outer contours 408 of the infrared image 402 and the outer contours 410 of visible image 404 are extracted and matched. For instance, a centroid or geometric center of the infrared outer contour 408 (not shown) may be matched with the centroid or geometric center of the visible outer contour 410 (not shown). In some cases, the infrared imaging module that produces the infrared image 402 and the visible imaging module that produces the visible image 404 may be disposed at a certain relative spatial configuration with each other (e.g., baseline displacement, relative rotation). In some embodiments, the calibration parameters describing such configuration can be predetermined, or determined during a calibration step discussed herein. The calibration parameters can be used to align the infrared image 402 and the visible image 404 in addition to or instead of the alignment of the contours. For example, image data associated with the visible image 404 may be transformed to from a first coordinate system (e.g., associated with the visible image 404) to a second coordinate system (e.g., associated with the infrared image 402). As another example, the image data associated with the visible image 402 may be transformed from a first coordinate system (associated with the visible image 404) to a third coordinate system and the image data associated with the infrared image 402 may be transformed from a second coordinate system (associated with the infrared image 402) to the third coordinate system Furthermore, the additional features extracted from the visible image 404, such as interior edges, textures, and patterns can be added to the infrared image. For example, some or all features of the target object 412 can be added to the infrared image to form the combined image 406. In some embodiments, the extent and/or the intensity of the visible features to be added can be configurable, for example, by the parameters discussed in block 308 of FIG. 3. For example, based on such parameters, some visible features of the target object 412 (e.g., contours of the body of the car and wheels) are added in the combined image 406, while some other features of the target object 412 (e.g., edges of the car windows) may be omitted. Additionally, the added features may have varying levels of intensity based on the value(s) of the parameter(s).

Figure 5:
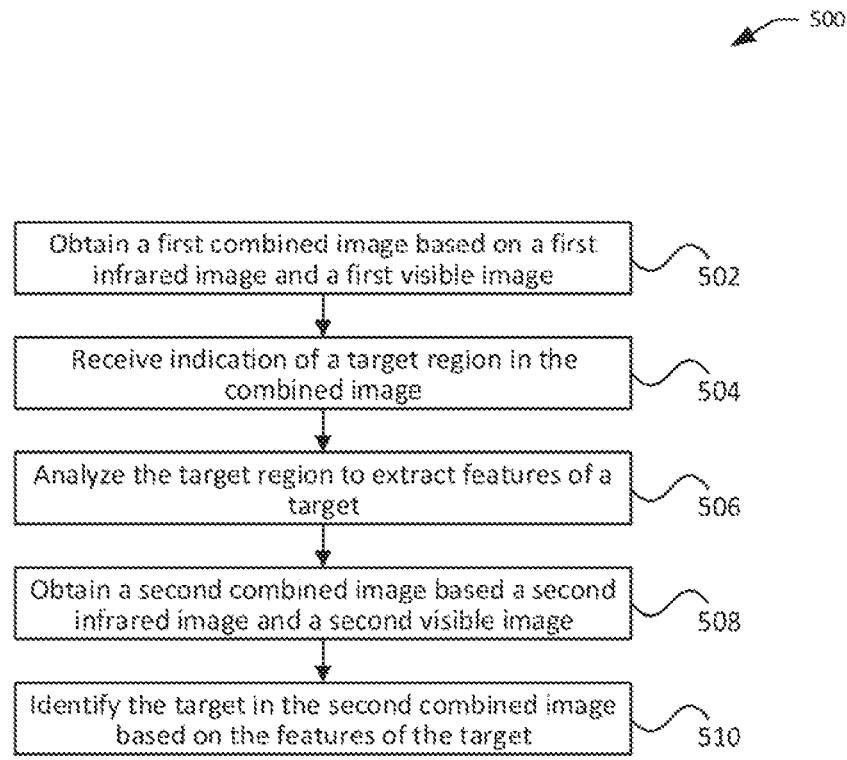
FIG. 5 illustrates an example of a process for target identification, in accordance with embodiments.

FIG. 5 illustrates an example of a process 500 for target identification, in accordance with embodiments. In some embodiments, the process 500 can be performed by a tracking module 114 discussed in FIG. 1.

At block 502, a first combined image based on a first infrared image and a first visible image is obtained. The first infrared image and the first visible image may be obtained from an infrared image stream and a visible image stream, respectively. The first combined image may be generated using a process similar to those discussed in FIGS. 3-4.

At block 504, an indication of a target region in the combined image is received. In some embodiments, the combined image may be transmitted to a remote terminal and displayed on a remote terminal. A user operating the remote terminal may indicate, via a user interface, a target region on the displayed combined image. Information about such indication of the target region, such as pixel coordinates of the target region, may be transmitted by the remote terminal and received by the tracking module. In some other embodiments, the indication of the target region may be provided by an automated process. For instance, coordinates of the target region may be estimated by the automated process based on a position of the target in one or more previous images. In yet some other embodiments, a semi-automated process may be utilized where an estimated target region is presented to a user for confirmation.

At block 506, the target region is analyzed to extract features of a target. Based on received indication of the target region (e.g., coordinates), the target region may be extracted and analyzed in detail. Features, such as colors, intensity, edges, corners, boundaries, texture, patterns, and the like, may be extracted. The extracted features may include low level features such as lines, texture elements, or regions, intermediate level features such as boundaries, surfaces, and volumes, and/or high level features such as objects and scenes. The extracted features may be classified, filtered, compared, or otherwise processed and/or stored for subsequent use.

At block 508, a second combined image based on a second infrared image and a second visible image is obtained. The second infrared image and the second visible image may be obtained from the infrared image stream containing the first infrared image and the visible image stream containing the first visible image, respectively. The second combined image may be generated using a process similar to those discussed in FIGS. 3-4. The first combined image and the second combined image may be part of a combined image stream.

At block 510, the target is identified in the second combined image based at least in part on the features of the target extracted in block 508. The second combined image may be processed to extracted features. The extracted features may at any suitable levels of abstraction, such as discussed above. The second combined image may be segmented, e.g., into salient regions or objects of interest. Various image recognition or image registration techniques (e.g., neural networks, deep learning) may be used to classify the extracted features and/or matching the extracted features with those target features extracted in block 508. In another example, the target information (e.g., position/size) in the first combined image can be used to limit the search space for image matching in the second combined image.

In some embodiments, the characteristics of the target in the second combined image may be used to generate a graphical target indicator (also referred to as a tracking indicator). For instance, target information (e.g., position and size) may be transmitted to a remote terminal, so that a graphical target indicator (e.g., a bounded box around the target) can be rendered around, at, or near the target in the combined image when the combined image is displayed on the remote terminal.

Figure 6:
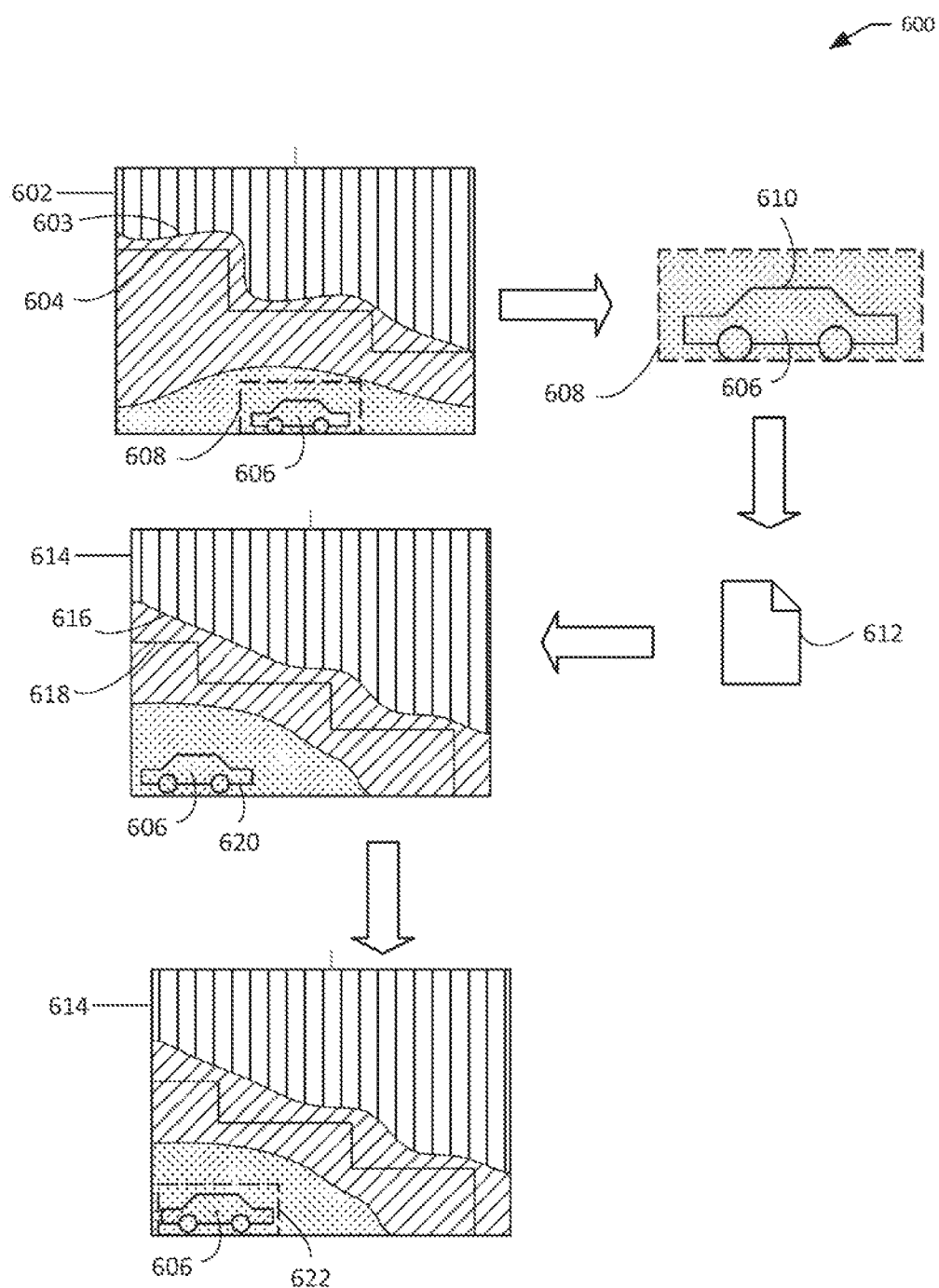
FIG. 6 illustrates an example of a process for target identification, in accordance with embodiments.

FIG. 6 illustrates an example of a process 600 for target identification, in accordance with embodiments. A first combined image 602 may be generated from a first infrared image and a first visible image as described herein. The first combined image 602 includes infrared features 603 from the infrared image and visible features (e.g., a first visible feature 604 and a second visible feature 610) from the visible image. Indication of a target region 608 may be received. The target region can include a target object (or target) 606. The target region 608 may be analyzed in detail to extract a collection of target features 612 (which may include the target features from the visible image, target features extracted from the infrared image, and/or target features obtained from other sources). The target features 612 can be used to identify the target 606 in another combined image 614. The second combined image 614 can include infrared features 616 from a second infrared image and visible features (e.g., a third visible feature 618 and a fourth visible feature 620) from a second visible image. The features of the second combined image 614 may be extracted and matched with the previously-extracted target features 612 to identify the target 606. Once identified, the target 606 can be indicated by a graphical target indicator (tracking indicator) 622, which may be rendered around the target 606 in the second combined image 614.

Figure 7:
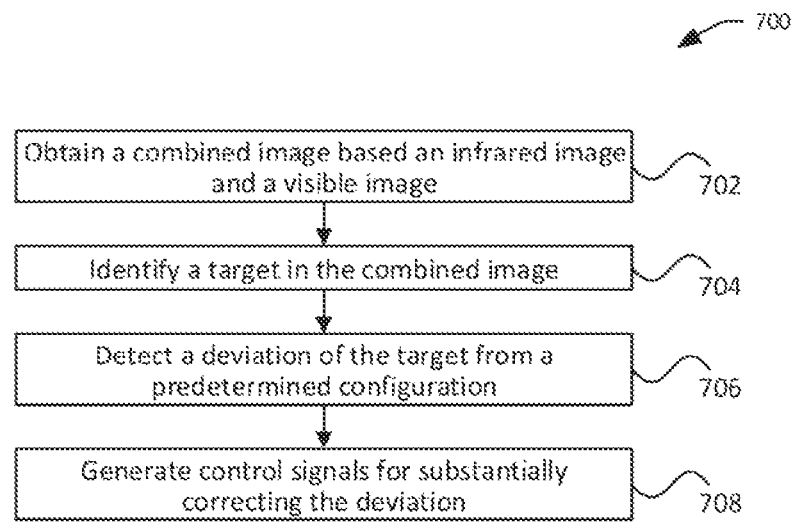
FIG. 7 illustrates an example of a process for target tracking, in accordance with embodiments.

FIG. 7 illustrates an example of a process 700 for target tracking, in accordance with embodiments.

At block 702, a combined image based on an infrared image and a visible image is obtained. The combined image may be generated based at least in part on the contour matching techniques discussed elsewhere herein. The combined image can include features from both the infrared image and the visible image.

At block 704, a target is identified in the combined image. The target can be identified based on target information associated with a specifically-identified target or those associated with a yet-to-be identified target. The initial target information may be received from a user interface provided by an application running on a remote terminal. For example, a user may interact with the user interface by touching or otherwise selecting a region associated with a desired target on an image displayed by the user interface using a finger, a stylus, or any other suitable input device. Based on the user interaction, the initial target information can be determined. In some other embodiments, the user interface may allow a user to enter information about a yet-to-be-identified target such as size, color, texture, and the like. In some embodiments, the initial target information may be obtained using mechanisms other than a user interface. For instance, the initial target information may be preloaded or provided by another device (e.g., peer device, controller, server). In some embodiments, the target information used to identify the target may be extracted by an automated or semi-automated process, e.g., based on machine learning algorithms. Advantageously, combining features from both the infrared image and the visible image allows more efficient and accurate target identification, which may be difficult using either pure infrared images or pure visible images.

At block 706, a deviation of the target from a predetermined target configuration is detected. Once the target is identified, the target's current configuration (e.g., current position, current size) can be determined. The current target configuration can be compared with the predetermined target configuration to determine if there is a deviation. Target configuration can include any characteristics associated with the target in the images such as its position and/or size in the images. In an example, the target position/size can be expressed using pixel coordinates. The predetermined target configuration (or expected target information) may include previously defined (or predefined) target configuration. The predefined target configuration may be specified by a user using a user interface (e.g., of a remote terminal) using any suitable input device (e.g., touchscreen, stylus), or received from another device. Or, the predefined target configuration may be set in default by a system administrator. Alternatively or additionally, the predetermined target configuration may include a previous target configuration, e.g., in one or more previous images. For example, the position/size of a target a first image may be used as the predetermined position/size for a subsequent, second image.

In some embodiments, one or more predetermined thresholds may be used to determine if there is a deviation. For instance, a displacement of the current target position from the expected target position by less than a threshold number of pixels A (e.g., 5 pixels) may not be considered a deviation in target position. Only when the displacement is equal or greater than the predetermined threshold A is it considered a deviation. Similarly, a change in size from the expected target size of less than a threshold number of pixels B (e.g., 10 pixels) may not be considered a deviation in target size. Only when the change is equal or greater than the predetermined threshold B is it considered a deviation.

At block 708, one or more control signals are generated for substantially correcting the deviation. A correction of the deviation includes a complete correction, where there is no longer any deviation, or a partial correction where the deviation is reduced. The control signals may be used to cause (directly or indirectly) a change of pose of the imaging device or imaging module used to generate the infrared images and/or the visible images with respect to one or more axes. For example, the control signals may cause the UAV and/or the carrier to move with respect to one or more axes. For example, the control signals be configured to set or change an angular velocity or an angular acceleration with respect to a yaw axis to correct a horizontal displacement and/or an angular velocity or an angular acceleration with respect to a pitch axis to correct a vertical displacement.

Additionally or alternatively, the control signals may be configured to adjust one or more imaging parameters of the imaging module, which may include a focal length, zoom level, image mode, image resolution, depth of field, exposure, lens speed, field of view, and the like. In some embodiments, the changes to the imaging parameters may be applied to both the infrared image generation and the visible image generation. For example, if a deviation from an expected target size is detected, the zoom for the infrared module and the zoom for the visible module can be increased or decreased to adjust the size of the target in subsequent images. In some other embodiments, the imaging parameters may apply to one but not both of the infrared and visible modules.

In some embodiments, generating the control signals comprises determining whether to move the UAV, the carrier, the imaging device, or any combination thereof based on the current configuration or constraints of the UAV, the carrier, and/or the imaging device. For instance, the current configuration or constraints may restrict the movement of the carrier with respect to a certain axis (e.g., a two-axis carrier lacks a third axis of freedom). In this case, the control signals may be generated for moving the UAV to compensate for such limitations. As another example, the UAV may be configured to execute a fixed mission or flight path, from which the UAV cannot deviate. In this case, the control signals can be generated for moving the carrier and/or the imaging device (e.g., zoom in/out) instead to compensate for such limitation of the UAV.

In some embodiments, the control signals may be generated by one or more processors onboard the UAV and provided to the flight controller (for controlling the UAV), the carrier controller (for controlling the carrier), and/or the imaging module/device. In some other embodiments where the control signals are generated by a remote device (e.g., a remote terminal), the control signals may be transmitted via a communication module to the UAV. The control signals may be transmitted via a wired or wireless connection (e.g., Bluetooth, Wifi, NFC).

Optionally, it may be determined whether to continue tracking. In some embodiments, the determination may be based on a user input via the user interface. For instance, the user may indicate that tracking is to be terminated by touching a "stop" button or a similar control on the user interface or by a controller (e.g., a base support coupled to the carrier). Otherwise, tracking of the target continues in subsequent images. Additionally or alternatively, the determination may be based on whether a target is detected in a current image. Tracking may be discontinued if the target is no longer detected. Otherwise, tracking of the target continues in subsequent images. In some cases, a user may also indicate whether to change the tracking target, for example, by touching or selecting a different object on the display and selecting "start" or a similar control. If a different target is to be tracked, then tracking starts for the newly selected target as described herein.

Figure 8:
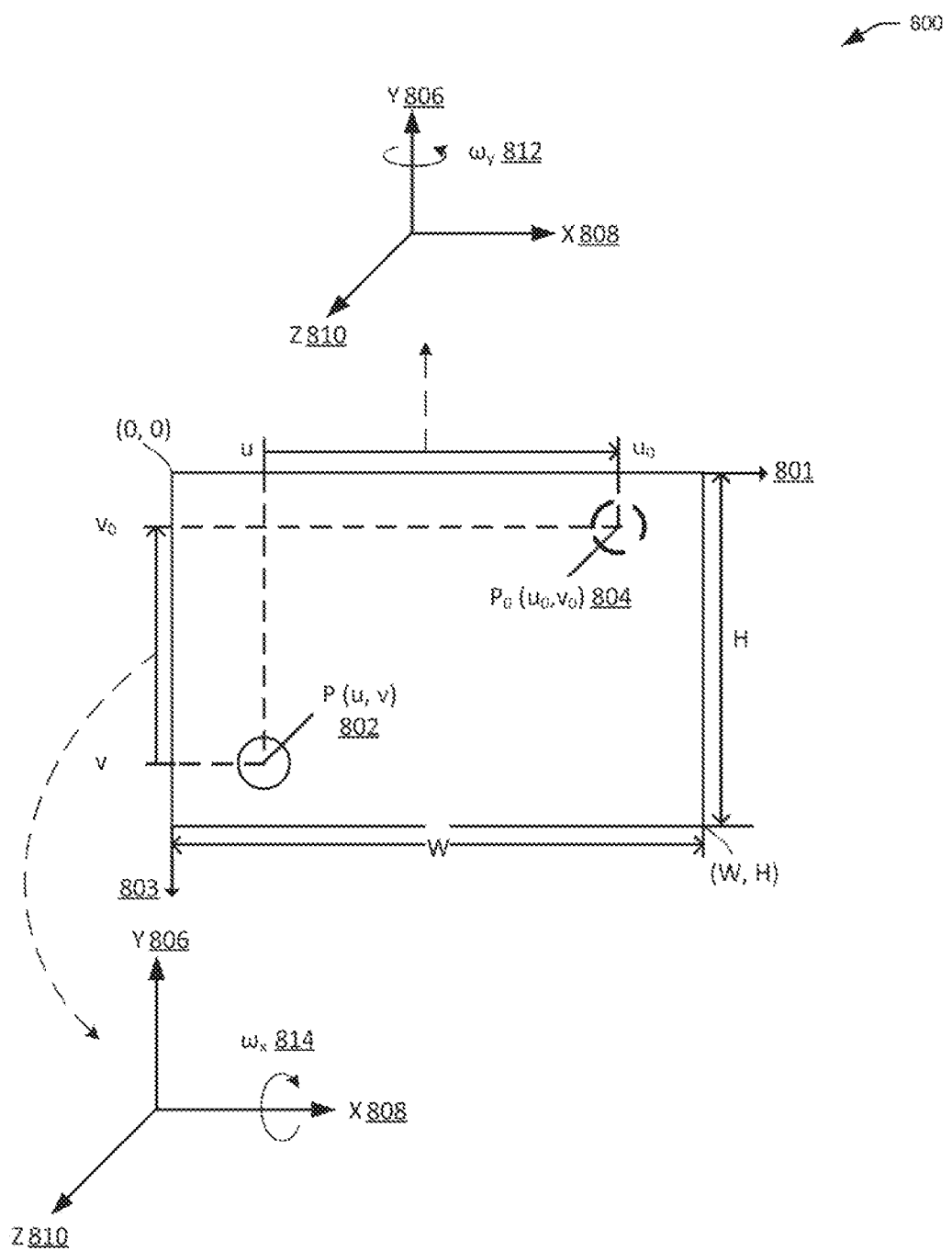
FIG. 8 illustrates an example of a method for maintaining an expected position of a target within an image, in accordance with embodiments.

FIG. 8 illustrates an example of a method for maintaining an expected position of a target within an image 800, in accordance with embodiments. The image 800 can be a combined image that is generated based on an infrared image and a visible image using techniques described herein. The image 800 may be generated by an imaging payload, which may be coupled to a carrier that allows the payload to move relative to the carrier with respect to up to three axes of freedom, as described herein. The carrier may be coupled to a movable object such as a UAV. Assume that the image has a width of W pixels and a height of H pixels (where W and H are positive integers). A position within the image can be defined by a pair of coordinates along a horizontal axis 801 (along the width of the image) and a vertical axis 803 (along the height of the image), where the upper left corner of image has coordinates (0, 0) and the lower right corner of the image has coordinates (W, H).

Assume that a target, as captured in the image 800, is located at position P (u, v) 802, and the expected position of the target is $P_0$ ($u_0$, $v_0$) 804 that is different from P 802. In some embodiments, the expected position of the target $P_0$ ($u_0$, v0) may be near the center of the image, such that $u_0$=W/2, and/or $v_0$=H/2. In other embodiment, the expected position of the target may be located anywhere else within the image (e.g., off-center). In various embodiments, the expected position of the target may or may not be the same as the initial position of the target. Assuming that the current position P is deviated from the expected position $P_0$ such that the deviation exceeds a predetermined threshold (such as expressed by a $\Delta x$ from $u_0$, and a $\Delta y$ from $v_0$), then an adjustment is required to bring the target position from P to close to the expected position $P_0$.

In some embodiments, the deviation from the expected target position can be used to derive one or more angular velocities for rotating the field of view of the imaging device (e.g., image sensor) around one or more axes. For example, deviation along the horizontal axis 801 of the image (e.g., between u and $u_0$) may be used to derive an angular velocity $\omega_Y$ 812 for rotating the field of view of the imaging device around the Y (yaw) axis 806, as follows:

$$\omega_Y = \alpha * (u - u_0), \text{ where } \alpha \in \mathbb{R} \text{ (real numbers)} \quad (1)$$

The rotation around the Y axis for the field of view of an imaging device may be achieved by a rotation of the movable object, a rotation of the payload (via a carrier) relative to the movable object, or a combination of both. In some embodiments, adjustment to the payload may be selected when adjustment to the movable object is infeasible or otherwise undesirable, for example, when the navigation path of the movable object is predetermined. In the equation (1), $\alpha$ is a constant that may be predefined and/or calibrated based on the configuration of the movable object (e.g., when the rotation is achieved by the movable object), the configuration of the carrier (e.g., when the rotation is achieved by the carrier), or both (e.g., when the rotation is achieved by a combination of the movable object and the carrier). In some embodiments, $\alpha$ is greater than zero ($\alpha > 0$). In other embodiments, a may be no greater than zero ($\alpha \leq 0$). In some embodiments, a can be used to map a calculated pixel value to a corresponding control lever amount or sensitivity for controlling the angular velocity around a certain axis (e.g., yaw axis). In general, the control lever may be used to control the angular or linear movement of a controllable object (e.g., the carrier or the UAV). Greater control lever amount corresponds to greater sensitivity and greater speed (for angular or linear movement). In some embodiments, the control lever amount or a range thereof may be determined by configuration parameters of the flight control system for a UAV or configuration parameters of a control system for a carrier. The upper and lower bounds of the range of the control lever amount may include any arbitrary numbers. For example, the range of the control lever amount may be (1000, −1000) for one flight control system and (−1000, 1000) for another flight control system.

As an example, assume that the images have a width of W=1024 pixels and a height of H=768 pixels. Thus, the size of the images is 1024*768. Further assume that the expected position of the target has a $u_0$=512. Thus, (u−$u_0$)∈(−512, 512). Assume that the range of the control lever amount around the yaw axis is (−1000, 1000), then the maximum control lever amount or maximum sensitivity is 1000 and $\alpha$=1000/512. Thus, the value of a can be affected by image resolution or size provided by the imaging device, range of the control lever amount (e.g., around a certain rotation axis), the maximum control lever amount or maximum sensitivity, and/or other factors.

For instance, when the rotation is achieved by rotation of the movable object with respect to the Y axis 806 of FIG. 8. The overall angular velocity of the field of view $\omega_Y$ is expressed as the angular velocity $\omega_{Y1}$ for the movable object:

$$\omega_Y = \omega_{Y1} = \alpha_1 * (u - u_0), \text{ where } \alpha_1 \in \mathbb{R} \quad (2)$$

In the equation (2), $\alpha_1$ is a constant that is defined based on the configuration of the movable object. In some embodiments, $\alpha_1$ is greater than zero ($\alpha_1 > 0$). The $\alpha_1$ can be defined similar to the $\alpha$ discussed above. For example, the value of $\alpha_1$ may be defined based on image resolution or size and/or range of control lever amount for the movable object (e.g., around the yaw axis).

Similarly, when the rotation is achieved by the rotation of the payload relative to the movable object (e.g., via the carrier) with respect to the Y axis 806 of FIG. 6. The overall angular velocity of the field of view $\omega_Y$ is expressed as the angular velocity $\omega_{Y2}$ for the payload relative to the movable object:

$$\omega_Y = \omega_{Y2} = \alpha_2 * (u - u_0), \text{ where } \alpha_2 \in \mathbb{R} \quad (3)$$

In the equation (3), $\alpha_2$ is a constant that is defined based on the configuration of the carrier and/or payload. In some embodiments, $\alpha_2$ is greater than zero ($\alpha_2 > 0$). The $\alpha_2$ can be defined similar to the $\alpha$ discussed above. For example, the value of $\alpha_2$ may be defined based on image resolution or size and/or range of control lever amount for the carrier (e.g., around the yaw axis).

In general, the angular velocity of the field of view around the Y (yaw) axis 806 can be expressed as a combination of the angular velocity $\omega_{Y1}$ for the movable object and the angular velocity $\omega_{Y2}$ for the payload relative to the movable object, such as the following:

$$\omega_Y = \omega_{Y1} + \omega_{Y2} \quad (4)$$

In the equation (4), either $\omega_{Y1}$ or $\omega_{Y2}$ may be zero.

As illustrated herein, the direction of the rotation around the Y (yaw) axis may depend on the sign of u−$u_0$. For instance, if the expected position is located to the right of the actual position (as illustrated in FIG. 8), then u−$u_0$<0, and the field of view needs to rotate in a counter-clockwise fashion around the yaw axis 806 (e.g., pan left) in order to bring the target to the expected position. On the other hand, if the expected position is located to the left of the actual position, then u−$u_0$>0, and the field of view needs to rotate in a clockwise fashion around the yaw axis 806 (e.g., pan right) in order to bring the target to the expected position.

As illustrated herein, the speed of rotation (e.g., absolute value of the angular velocity) around a given axis (e.g., the Y (yaw) axis) may depend on the distance between the expected and the actual position of the target along the axis (i.e., |u−$u_0$|). The further the distance is, the greater the speed of rotation. Likewise, the closer the distance is, the slower the speed of rotation. When the expected position coincides with the position of the target along the axis (e.g., u=$u_0$), then the speed of rotation around the axis is zero and the rotation stops.

The method for adjusting the deviation from the expected target position and the actual target position along the horizontal axis 801, as discussed above, can be applied in a similar fashion to correct the deviation of the target along a different axis 803. For example, deviation along the vertical axis 803 of the image (e.g., between v and $v_0$) may be used to derive an angular velocity $\omega_X$ 814 for the field of view of the imaging device around the X (pitch) axis 808, as follows:

$$\omega_X = \beta * (v - v_0), \text{ where } \beta \in \mathbb{R} \quad (5)$$

The rotation around the X axis for the field of view of an imaging device may be achieved by a rotation of the movable object, a rotation of the payload (via a carrier) relative to the movable object, or a combination of both. Hence, in the equation (5), β is a constant that may be predefined and/or calibrated based on the configuration of the movable object (e.g., when the rotation is achieved by the movable object), the configuration of the carrier (e.g., when the rotation is achieved by the carrier), or both (e.g., when the rotation is achieved by a combination of the movable object and the carrier). In some embodiments, β is greater than zero (β>0). In other embodiments, β may be no greater than zero (β≤0). In some embodiments, β can be used to map a calculated pixel value to a corresponding control lever amount for controlling the angular velocity around a certain axis (e.g., pitch axis). In general, the control lever may be used to control the angular or linear movement of a controllable object (e.g., UAV or carrier). Greater control lever amount corresponds to greater sensitivity and greater speed (for angular or linear movement). In some embodiments, the control lever amount or a range thereof may be determined by configuration parameters of the flight control system for a UAV or configuration parameters of a carrier control system for a carrier. The upper and lower bounds of the range of the control lever amount may include any arbitrary numbers. For example, the range of the control lever amount may be (1000, −1000) for one control system (e.g., flight control system or carrier control system) and (−1000, 1000) for another control system.

For instance, assume that the images have a width of W=1024 pixels and a height of H=768 pixels. Thus, the size of the images is 1024*768. Further assume that the expected position of the target has a $v_0$=384. Thus, $(v-v_0) \in (-384, 384)$. Assume that the range of the control lever amount around the pitch axis is (−1000, 1000), then the maximum control lever amount or maximum sensitivity is 1000 and β=1000/384. Thus, the value of β can be affected by image resolution or size provided by the imaging device, range of the control lever amount (e.g., around a certain rotation axis), the maximum control lever amount or maximum sensitivity, and/or other factors.

For instance, when the rotation is achieved by rotation of the movable object with respect to the axis X 808, the angular velocity of the field of view $\omega_X$ is expressed as the angular velocity $\omega_{X1}$ for the movable object:

$$\omega_X = \omega_{X1} = \beta_1 * (v - v_0), \text{ where } \beta_1 \in \mathbb{R} \quad (6)$$

In the equation (6), $\beta_1$ is a constant that is defined based on the configuration of the movable object. In some embodiments, $\beta_1$ is greater than zero ($\beta_1$>0). The $\beta_1$ can be defined similar to the β discussed above. For example, the value of $\beta_1$ may be defined based on image resolution or size and/or range of control lever amount for the movable object (e.g., around the pitch axis).

Similarly, when the rotation is achieved by the rotation of the payload relative to the movable object (e.g., via the carrier) with respect to the axis X 808, the angular velocity of the field of view $\omega_X$ is expressed as the angular velocity $\omega_{X2}$ for the payload relative to the movable object:

$$\omega_X = \omega_{X2} = \beta_2 * (v - v_0), \text{ where } \beta_2 \in \mathbb{R} \quad (7)$$

In the equation (7), $\beta_2$ is a constant that is defined based on the configuration of the carrier and/or payload. In some embodiments, $\beta_2$ is greater than zero ($\beta_2$>0). The $\beta_2$ can be defined similar to the β discussed above. For example, the value of $\beta_2$ may be defined based on image resolution or size and/or range of control lever amount for the movable object (e.g., around the pitch axis).

In general, the angular velocity of the field of view around the X (pitch) axis 808 can be expressed as a combination of the angular velocity $\omega_{X1}$ for the movable object and the angular velocity $\omega_{X2}$ for the payload relative to the movable object, such as the following:

$$\omega_X = \omega_{X1} + \omega_{X2} \quad (8)$$

In the equation (8), either $\omega_{X1}$ or $\omega_{X2}$ may be zero.

As illustrated herein, the direction of the rotation around the X (yaw) axis may depend on the sign of $v-v_0$. For instance, if the expected position is located above of the actual position (as illustrated in FIG. 8), then $v-v_0$>0, and the field of view needs to rotate in a clockwise fashion around the pitch axis 808 (e.g., pitch down) in order to bring the target to the expected position. On the other hand, if the expected position is located to below the actual position, then $v-v_0$<0, and the field of view needs to rotate in a counter-clockwise fashion around the pitch axis 808 (e.g., pitch up) in order to bring the target to the expected position.

As illustrated herein, the speed of rotation (e.g., absolute value of the angular velocity) depends on the distance between the expected and the actual position of the target (i.e., $|v-v_0|$) along a give axis (e.g., the X (pitch) axis). The further the distance is, the greater the speed of rotation. The closer the distance is, the slower the speed of rotation. When the expected position coincides with the position of the target (e.g., $v=v_0$), then the speed of rotation is zero and the rotation stops.

In some embodiments, the values of the angular velocities as calculated above may be constrained or otherwise modified by various constraints of the system. Such constraints may include the maximum and/or minimum speed that may be achieved by the movable object and/or the imaging device, the range of control lever amount or the maximum control lever amount or maximum sensitivity of the control system for the movable object and/or the carrier, and the like. For example, the rotation speed may be the minimum of the calculated rotation speed and the maximum speed allowed.

In some embodiments, warning indicators may be provided when the calculated angular velocities need to be modified according to the constraints described herein. Examples of such warning indicators may include textual, audio (e.g., siren or beeping sound), visual (e.g., certain color of light or flashing light), mechanical, any other suitable types of signals. Such warning indicators may be provided directly by the movable object, carrier, payload, or a component thereof. Alternatively or additionally, warning indicators may be provided by the control terminal (e.g., via the display). In the latter case, the control terminal may provide the warning indicators based on signals from the movable object.

Figure 9:
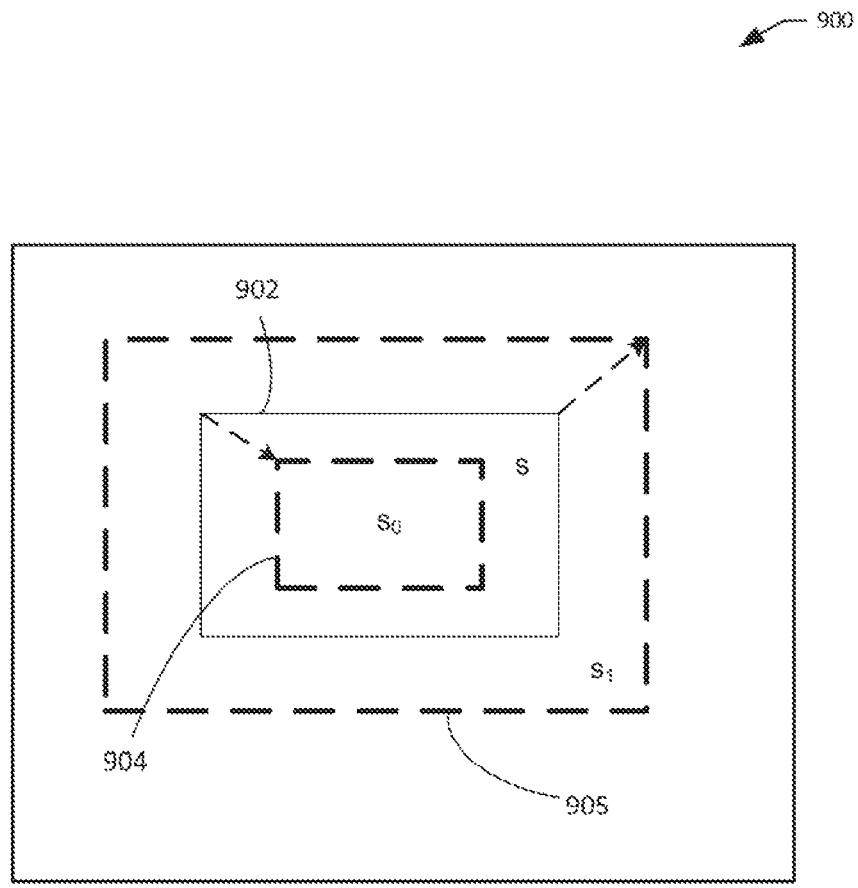
FIG. 9 illustrates an exemplary method for maintaining an expected position of a target within an image, in accordance with embodiments.

FIG. 9 illustrates an exemplary tracking method for maintaining an expected size of a target, in accordance with embodiments. An exemplary image 800 may be a combined image captured by an imaging device carried by a movable object. Assume that a target 902 is captured by the image 900. The actual size of the target within the image can be s pixels (such as calculated as the product of the width of the target and the height of the target). The expected target size S may be smaller (e.g., the expected target may be represented by 904 and S=$s_0$) or larger (e.g., the expected target may be represented by 905 and S=$s_1$) than the actual size s. The expected size of the target may or may not be the same as the initial size of the target (e.g., as provided by the control terminal). Assuming that the current size s is deviated from the expected size $s_0$ or $s_1$ such that the deviation exceeds a predetermined threshold (such as a predefined Δs pixels), then an adjustment is required to bring the target size close to the expected size $s_0$ or $s_1$.

Although display area of the image and target is shown as rectangles, it is for illustrative purposes only and not intended to be limiting. Rather, the display area of the image and/or target may be of any suitable shapes in various embodiments such as circles, ovals, polygons, and the like. Likewise, although the areas discussed herein are expressed in pixels, these are for illustrative purposes only and not intended to be limiting. In other embodiments, the areas may be expressed in any suitable units such as megapixels, $mm^2$, $cm^2$, $inch^2$, and the like.

In some embodiments, the deviation from the expected target size can be used to derive one or more linear velocities for the movable object and/or imaging device along one or more axes. For example, deviation in the target size between actual target size s and the expected target size S (e.g., $S=s_0$ or $s_1$) can be used to determine a linear velocity V for moving the movable object along a Z (roll) axis 810, as follows:

$$V=\delta*(1-s/S), \text{ where } \delta \in \mathbb{R} \quad (9)$$

In the equation (9), $\delta$ is a constant that is defined based on the configuration of the movable object or any suitable controllable object (e.g., carrier) that may cause the field of view to move toward and/or away from the target. In some embodiments, $\delta$ is greater than zero ($\delta>0$). In other embodiments, $\delta$ may be no greater than zero ($\delta \leq 0$). In some embodiments, $\delta$ can be used to map a calculated pixel value to a corresponding control lever amount or sensitivity for controlling the linear velocity.

In general, V represents the velocity of the movable object toward or away from the target. The velocity vector points from the UAV to the target. If the actual size s of the target is smaller than the expected size S, then V>0 and the movable object moves towards the target so as to increase the size of the target as captured in the images. On the other hand, if the actual size s of the target is larger than the expected size S, then V<0 and the movable object moves away from the target so as to reduce the size of the target as captured in the images.

For instance, assume that the images have a width of W=1024 pixels and a height of H=768 pixels. Thus, the size of the images is 1024*768. Assume that the range of the control lever amount for controlling the linear velocity is (−1000, 1000). In an exemplary embodiment, $\delta=-1000$ when s/S=3 and $\delta=1000$ when s/S=1/3.

In some embodiments, the values of the velocities as calculated above may be constrained or otherwise modified by various constraints of the system. Such constraints may include the maximum and/or minimum speed that may be achieved by the movable object and/or the imaging device, the maximum sensitivity of the control system for the movable object and/or the carrier, and the like. For example, the speed for the movable object may be the minimum of the calculated speed and the maximum speed allowed.

Alternatively or additionally, the deviation between the actual target size and the expected target size can be used to derive adjustment to the operational parameters of the imaging device such as a zoom level or focal length in order to correct the deviation. Such adjustment to the imaging device may be necessary when adjustment to the movable object is infeasible or otherwise undesirable, for example, when the navigation path of the movable object is predetermined. An exemplary focal length adjustment F can be expressed as:

$$F=\gamma*(1-s/S), \text{ where } \gamma \in \mathbb{R} \quad (10)$$

Where $\gamma$ is a constant that is defined based on the configuration of the imaging device. In some embodiments, $\gamma$ is greater than zero ($\gamma>0$). In other embodiments, $\gamma$ is no greater than zero ($\gamma \leq 0$). The value of $\gamma$ may be defined based on the types of lenses and/or imaging devices.

If the actual size s of the target is smaller than the expected size S, then F>0 and the focal length increases by |F| so as to increase the size of the target as captured in the images. On the other hand, if the actual size s of the target is larger than the expected size S, then F<0 and the focal length decreases by |F| so as to reduce the size of the target as captured in the images. For example, in an embodiment, $\gamma=10$. This means that, for example, when the actual size of the target is double the size of the expected size S, the focal length should be decreased by 10 mm accordingly (i.e., F=10*(1−2/1)=−10) and vice versa.

In some embodiments, the adjustment to the operational parameters of the imaging device such as focal length may be constrained or otherwise modified by various constraints of the system. Such constraints may include, for example, the maximum and/or minimum focal lengths that may be achieved by the imaging device. As an example, assume the focal length range is (20 mm, 58 mm). Further assume that the initial focal length is 40 mm. Then when s>S, the focal length should be decreased according to equation (10); and when s<S, the focal length should be increased according to equation (10). However, such adjustment is limited by the lower and upper bounds of the focal length range (e.g., 20 mm to 58 mm). In other words, the post-adjustment focal length should be no less than the minimum focal length (e.g., 20 mm) and no more than the maximum focal length (e.g., 58 mm).

As discussed above in FIG. 8, warning indicators may be provided when the calculated adjustment (e.g., linear velocity of movable object or focal length) is modified according to the constraints described herein. Examples of such warning indicators may include textual, audio (e.g., siren or beeping sound), visual (e.g., certain color of light or flashing light), mechanical, any other suitable types of signals. Such warning indicators may be provided directly by the movable object, carrier, payload, or a component thereof. Alternatively or additionally, warning indicators may be provided by the control terminal (e.g., via the display). In the latter case, the control terminal may provide the warning indicators based on signals from the movable object.

Figure 10:
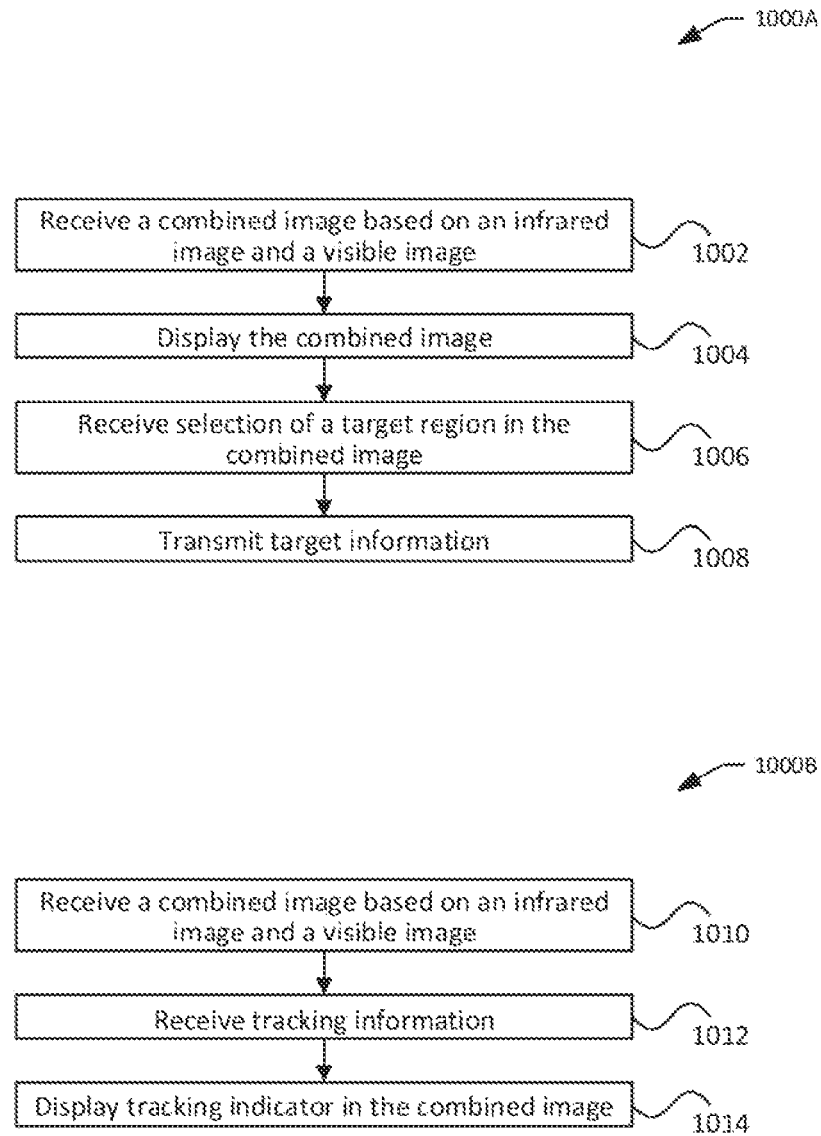
FIG. 10 illustrates example processes 1000A and 1000B that can be implemented by a tracking application, in accordance with embodiments.

FIG. 10 illustrates example processes 1000A and 1000B that can be implemented by a tracking app, in accordance with embodiments. The tracking app may be similar to the tracking app 120 described in FIG. 1. The tracking app may be configured to run on a remote terminal (e.g., a remote controller, smartphone, tablet, or wearable device).

Starting with process 1000A. At block 1002, a combined image based on an infrared image and a visible image is received. The combined image may be generated using the imaging matching techniques described herein. For example, the combined image may be generated by applying features from the visible image (e.g., inner edges) to the infrared image based at least in part on contour matching between the infrared image and the visible image. The combined image may be received, directly or indirectly, from a remote UAV. In some embodiments, the infrared image and/or the visible image may also be received.

At block 1004, the combined image is displayed. The combined image may be displayed on a display of a remote terminal. In some embodiments, only the combined images are displayed. In some other embodiments, multiple types of images (e.g., combined and infrared images, combined and visible images, or all three types of images) may be displayed simultaneously. In some other embodiments, the display may be toggled to show different types of images. For example, a user interface may be provided for a user to toggle the display among an infrared mode (showing only the infrared image), a visible mode (showing only the visible image), and a combined mode (showing the combined image).

At block 1006, a selection of a target region on the combined image is received. In some embodiments, a tracking app may enable a user to select a target from one or more images that are being displayed. For example, the user may select a target by directly touching the screen using a finger or stylus or selection using a mouse or joystick. The user may draw around the target, touch the target in the image, or otherwise select the target. Based on the user input, the boundary of a target region can be determined. In some cases, more than one targets may be selected. In some embodiments, the selected target is displayed with a selection indicator to indicate that the user has selected the target for tracking. In some embodiments, the user may also be allowed to enter or select target type information such as color, texture, shape, dimension, or other characteristics associated with a desired target. For example, the user may type in the target type information, select such information using a graphical user interface, or use any other suitable methods. In some other embodiments, the target information may be obtained from sources other than the user such as a remote or local data store, other computing devices operatively connected to or otherwise in communication with the remote terminal, or the like.

At block 1008, target information is transmitted. The target information may be transmitted to a remote movable object such as a UAV for tracking purposes. The target information may be generated based on the selection of the target region. The target information may include a position and/or boundary of the target region that is selected in block 1006, e.g., using pixel coordinates and/or pixel counts. In some embodiments, additional target information may be transmitted. Such additional target information may be provided by a user via a user interface. Additionally or alternatively, the target region may be processed locally at the remote terminal to extract certain target features and such extracted target features may be transmitted as part of the target information. In some embodiments, the target information may also include predetermined expected target configuration, which specifies expected target position, size, or other characteristics. Such expected target configuration can be used (e.g., by the tracking module) to detect any deviation and the detected deviation can be used to generate control signals, as described herein.

Turning to process 1000B. At block 1010, a combined image based on an infrared image and a visible image is received. The combined image may be generated using the imaging matching techniques described herein. The combined image may be received, directly or indirectly, from a remote UAV.

At block 1012, tracking information is received. The tracking information may be received, directly or indirectly, from a remote UAV. The tracking information may indicate a position, size, or boundary of a tracked target in the combined image that is received in block 1010. For example, the tracking information may include the pixel coordinates of the boundary around the target, pixel coordinates of one or more points covered by the target, and the like. The tracking information may be result from target identification described herein (e.g., performed by a tracking module).

At block 1014, a tracking indicator is displayed in the combined image. A graphical target indicator (tracking indicator) may be displayed for each of one or more targets identified based on the tracking information. Examples of such graphical target indicators can include bounded boxes or any other geometric shapes, arrows, highlighted areas, and the like.

Other variations are also within the scope of the present disclosure. The techniques described herein for tracking one target in an image can be used for tracking multiple targets in an image. The techniques described herein with respect to processing single image frames can be applied to image streams (pluralities of images). Some or all of the tracking and/or image processing functionalities described herein can be implemented at least in part by one or more processors in a remote terminal. For example, the remote terminal may be configured to receive infrared images and visible images captured by the UAV-carried imaging device(s) and generate combined images using the methods described herein. The remote terminal may be configured to identify one or more targets in the combined images. The remote terminal may be configured to generate one or more control signals based on the identified targets and transmit these control signals to the UAV to effect control of the UAV, the carrier, and/or the imaging device(s).

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
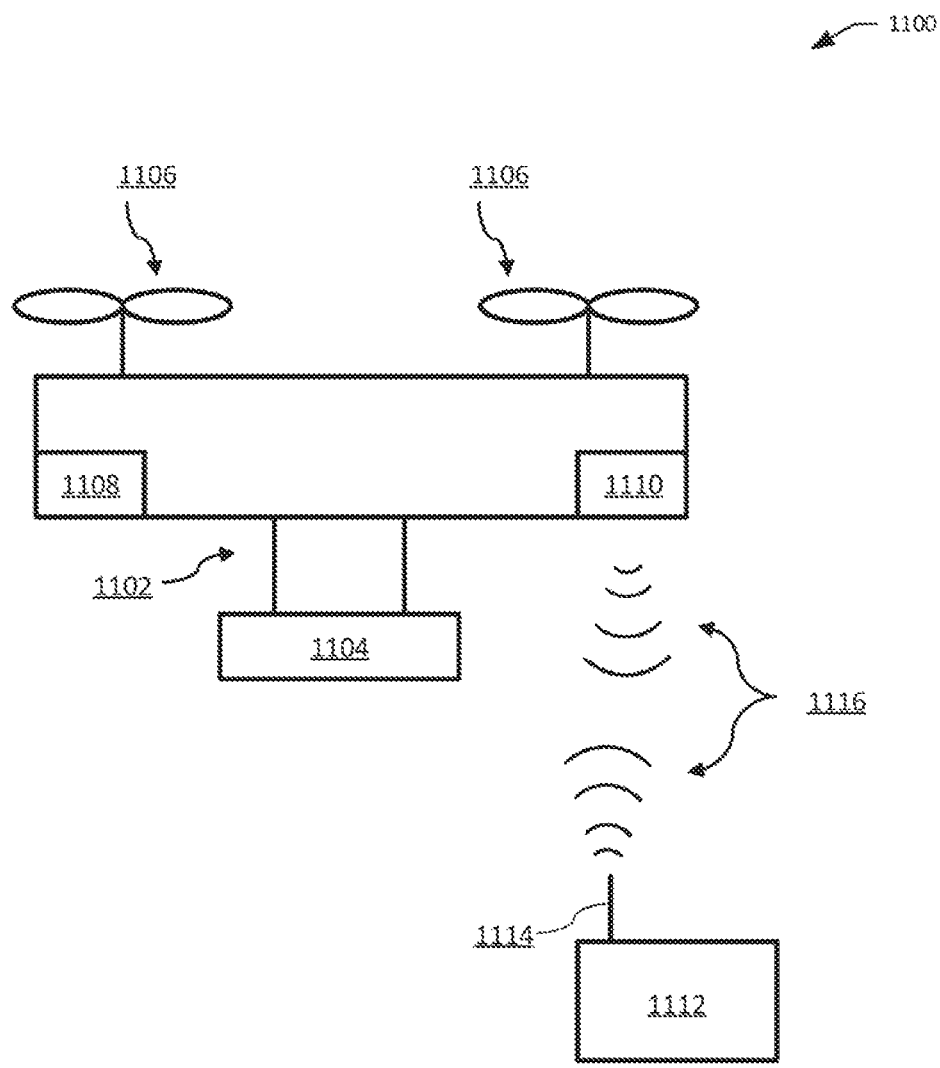
FIG. 11 illustrates a movable object including a carrier and a payload, in accordance with embodiments.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems (the communication system 1110 of the movable object 1100, the communication system 1114 of the terminal 1112) may include any number of transmitters, receivers, and/or transceivers suitable for wireless communication. The communication may be one-way communication; such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 12:
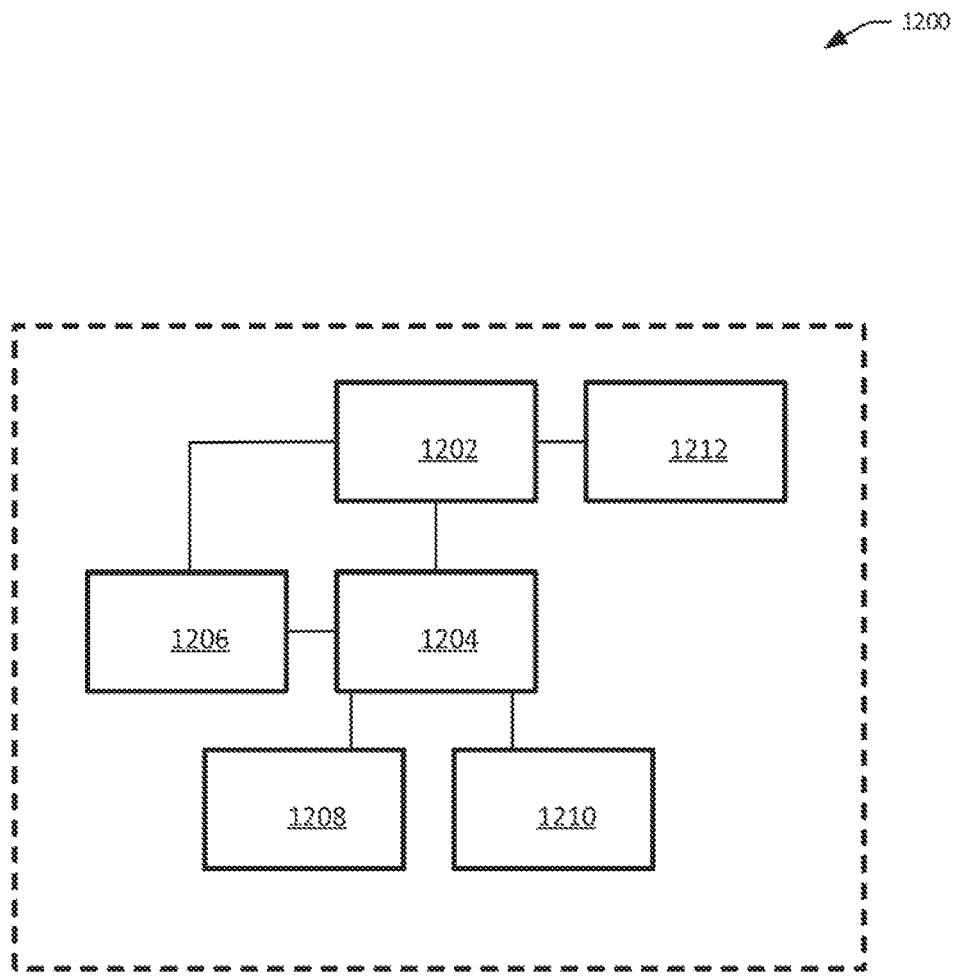
FIG. 12 is a schematic illustration by way of block diagram of a system for controlling a movable object, in accordance with embodiments.

FIG. 12 is a schematic illustration by way of block diagram of a system 1200 for controlling a movable object, in accordance with embodiments. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable or non-programmable processor (e.g., a central processing unit (CPU), a microprocessor, an FPGA, an application-specific integrated circuit (ASIC)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method for tracking, comprising:
obtaining an infrared image and a visible image from an imaging device supported by a carrier of an unamend aerial vehicle (UAV);
combining the infrared image and the visible image to obtain a combined image, including:
matching the infrared image and the visible image based on matching results of different matching methods, including:
obtaining a first matching result by a first matching method;
obtaining a second matching result by a second matching method;
combining, linearly or non-linearly, the first matching result having a first weight and the second matching result having a second weight to derive a final matching result; and
matching the infrared image and the visible image based on the final matching result;
identifying a target in the combined image; and
controlling at least one of the UAV, the carrier, or the imaging device to track the identified target.

2. The method of claim 1, wherein matching the infrared image and the visible image includes:
processing the infrared image to extract infrared features;
processing the visible image to extract the visible features; and
matching the infrared image and the visible image based on the infrared features and the visible features.

3. The method of claim 2, wherein combining the infrared image and the visible image includes:
applying at least one of the visible features to the infrared image to generate the combined image based on the matching.

4. The method of claim 3, wherein applying the at least one of the visible features to the infrared image includes:
determining the at least one of the visible features based on prominence of the visible features, wherein prominence of a feature is positively correlated to at least one of a size of the feature or obviousness of an edge of the feature.

5. The method of claim 4, wherein determining the at least one of the visible features based on the prominence of the visible features includes:
sorting the visible features of the visible image in a rank of prominence from high to low or low to high; and
determining one or more visible features of highest prominence in the rank as the at least one visible features to be applied to the infrared image.

6. The method of claim 3, wherein applying the at least one of the visible features to the infrared image includes:
determining an intensity of the at least one of the visible features; and
applying the at least one of the visible features having the determined intensity to the infrared image.

7. The method of claim 2, wherein:
the infrared features include an infrared outer contour and the visible features include a visible outer contour; and
matching the infrared image and the visible image further includes aligning the infrared outer contour with the visible outer contour.

8. The method of claim 1, wherein identifying the target in the combined image includes:
obtaining target information corresponding to the target; and
identifying the target based on the target information.

9. The method of claim 8, wherein obtaining target information corresponding to the target includes:
obtaining the target information based on a user operation through a remote terminal.

10. The method of claim 9, wherein the target information includes at least one of a size, a color, or a texture of the target.

11. The method of claim 1, wherein identifying the target in the combined image includes:
- extracting one or more target features of the target in a pre-obtained image; and
- identifying the target in the combined image based on the one or more target features.

12. The method of claim 1, wherein controlling the at least one of the UAV, the carrier, or the imaging device to track the identified target includes detecting a deviation of the target from a predetermined configuration in the combined image and generating the control signals based on the deviation.

13. The method of claim 12, wherein the predetermined configuration includes at least one of a predetermined position or a predetermined size.

14. The method of claim 1, further comprising:
- displaying a graphical tracking indicator corresponding to the target in the combined image.

15. The method of claim 1, further comprising:
- determining an adjusted operation parameter of the at least one of the UAV, the carrier, or the imaging device to track the identified target;
- determining whether the adjusted operation parameter compliance operation limits of the UAV, the carrier, and the imaging device; and
- modifying the adjusted operation parameter in response to determining that the adjusted operation parameter does not compliance the operation limits.

16. The method of claim 15, further comprising:
- generating and outputting a warning indicator in response to modifying the adjusted operation parameter, the waring indicator including at least one of a textual, audio, visual, or mechanical signal.

17. An unmanned aerial vehicle (UAV), comprising:
a carrier;
a memory that stores one or more computer-executable instructions; and
one or more processors configured to access the memory and execute the computer-executable instructions to:
- obtain, from an imaging device supported by the carrier, an infrared image and a visible image;
- combine the infrared image and the visible image to obtain a combined image, including:
  - matching the infrared image and the visible image based on matching results of different matching methods, including:
    - obtaining a first matching result by a first matching method;
    - obtaining a second matching result by a second matching method;
    - combining, linearly or non-linearly, the first matching result having a first weight and the second matching result having a second weight to derive a final matching result; and
  - matching the infrared image and the visible image based on the final matching result;
- identify a target in the combined image; and
- control at least one of the UAV, the carrier, or the imaging device to track the identified target.

18. A tracking system, comprising:
a memory that stores one or more computer-executable instructions; and
one or more processors configured to access the memory and execute the computer-executable instructions to:
- obtain, from an imaging device supported by a carrier of an unmanned aerial vehicle (UAV), an infrared image and a visible image;
- combine the infrared image and the visible image to obtain a combined image, including:
  - matching the infrared image and the visible image based on matching results of different matching methods, including:
    - obtaining a first matching result by a first matching method;
    - obtaining a second matching result by a second matching method;
    - combining, linearly or non-linearly, the first matching result having a first weight and the second matching result having a second weight to derive a final matching result; and
  - matching the infrared image and the visible image based on the final matching result;
- identify a target in the combined image; and
- control at least one of the UAV, the carrier, or the imaging device to track the identified target.

* * * * *